(12) United States Patent
Turos

(10) Patent No.: US 7,992,282 B2
(45) Date of Patent: Aug. 9, 2011

(54) REVERSIBLE FLANGE PLATE METHODS

(75) Inventor: Kenneth Turos, Las Cruces, NM (US)

(73) Assignee: Sun Systems, Inc., Las Cruces, NM (US)

(*) Notice: Subject to any disclaimer, the term of this patent is extended or adjusted under 35 U.S.C. 154(b) by 0 days.

(21) Appl. No.: 12/824,993

(22) Filed: Jun. 28, 2010

(65) Prior Publication Data

US 2010/0263501 A1 Oct. 21, 2010

Related U.S. Application Data

(62) Division of application No. 11/365,733, filed on Mar. 1, 2006, now Pat. No. 7,765,667.

(51) Int. Cl.
*B23P 13/04* (2006.01)
(52) U.S. Cl. ........................................ 29/557

(58) Field of Classification Search ............... 29/557, 29/402.19, 428, 402.01, 402.04, 402.05, 29/402.06, 402.09, 469, 897.2; 82/112, 1.11, 82/151, 157, 162, 101
See application file for complete search history.

(56) References Cited

U.S. PATENT DOCUMENTS 6,554,291 B2 * 4/2003 Turos ........................ 279/133

* cited by examiner

*Primary Examiner* — John C Hong
(74) *Attorney, Agent, or Firm* — Ray R. Regan

(57) ABSTRACT

Methods of refinishing differently configured brakes are disclosed that include constructing a reversible flange plate by forming a body with a hollow bore extending through the center of the body, installing rings adjacent a hollow bore in the body, and manipulating the body in such a way as to allow the body to be mounted on a brake lathe to refinish differently configured brakes.

15 Claims, 7 Drawing Sheets

REVERSIBLE FLANGE PLATE METHODS

CROSS-REFERENCE TO RELATED APPLICATION

This application is a divisional application Ser. No. 11/365,733 entitled REVERSIBLE FLANGE PLATE filed on Mar. 1, 2006 now U.S. Pat. No. 7,765,667 ("Parent Application") for which the U.S. Patent Office has issued a notice of allowability to the same sole inventor named in this application. The specification of the application is incorporated by reference into this document.

FIELD OF TECHNOLOGY

The apparatus and method for making the apparatus disclosed and claimed in this document pertain generally to securing a brake to a rotatable machine member to perform work on the brake. More particularly, the new and useful reversible flange plate disclosed and claimed in this document is reversibly mountable on a shaft or arbor of a brake lathe to which a vehicular brake or flywheel has been secured for machining, refinishing, balancing and resurfacing operations (collectively, "refinishing"). The reversible flange plate is particularly, but not exclusively, useful for saving an operator both time and money during refinishing, while ensuring that the brake rotor is machined to exacting specifications.

BACKGROUND

In connection with a motor vehicle, a brake, of course, is any mechanical device for arresting the motion of a wheel (and accordingly the vehicle) by means of friction. Kinetic energy is converted into heat energy through use of frictional forces applied to the wheels of the vehicle, causing the vehicle to slow or stop. A drum brake is a type of brake using a drum-shaped metal cylinder attached to the inner surface of the wheel of a motor vehicle and rotating within it. When the brake is applied, curved brake shoes with friction linings press against the drum's inner circumference to slow or stop the vehicle. The rotating part of a disc brake is also called a "rotor." The nonrotating, basically stationary, component of a disc brake system is a brake caliper that applies force from a hydraulic system to the rotor or disc to decelerate and stop a vehicle.

Brake fade is a condition brought about by repeated or protracted braking that results in reduced braking effectiveness (fading). Heat is the primary cause of brake fade, which in turn causes expansion and other undesirable thermal effects on a brake. Although disc brakes are less prone to fade because rotors are more effectively cooled by air moving across the brakes, and can be internally vented to increase resistance to fade, nevertheless persistent stop-and-start braking causes damage to any brake, whether a drum or rotor. Accordingly, a significant industry has developed in connection with the machining, refinishing, balancing and resurfacing of brake rotors.

To refinish a brake, a drum or a rotor is mounted on the shaft or arbor of a brake lathe system. During operation, forces due to rotation and gravity tend to preclude uniform rotation of the rotating arbor on which a brake has been mounted. The arbor and devices mounted on the arbor for refinishing do not rotate in a single, unvarying plane of rotation. The forces acting on a rotating arbor and brake may distort in one or more planes and along one or more axes of rotation. The forces exert a variety of angular and planar forces that affect how accurately and quickly the brake lathe operator may work on a brake to refinish it.

In addition, forces and force vectors may induce harmonics and vibrations that may be transmitted to the arbor, brake and other components of the lathe. A nonuniform rotation of a brake during a refinishing operation may cause a cutting tool brought into contact with a brake surface to produce an inferior surface.

To overcome such undesirable problems, the inventor named in this document has received a number of U.S. patents for apparatus and methods that resolve in an exemplary fashion adverse consequences of such forces, thus improving the refinishing process, including U.S. Pat. No. 6,279,919B1 issued Aug. 28, 2001 for an Apparatus for Securing a Workpiece to a Rotatable Machine Member; U.S. Pat. No. 6,554,291B1 issued Apr. 29, 2003 for an Apparatus for Securing a Workpiece to a Rotatable Machine Member; U.S. Pat. No. 6,397,989B1 issued on Jun. 4, 2002 for an Apparatus for Reducing Harmonics and Vibrations of a Rotatable Base Piece; U.S. Pat. No. 6,631,660B1 issued Oct. 14, 2003, for a Self-Aligning Arbor Nut System. The inventor currently has pending a U.S. patent application for a Multi-angle Cutting Head, application Ser. No. 10/684,021 filed on Oct. 10, 2003. The patents and application are collectively referred to in this document as the "Prior Patents".

The apparatus and method described and claimed in this document add to the art by providing a reversible flange plate that reduces costs associated with refinishing a rotor by providing on one apparatus differently configured surfaces that allow an operator to reverse the orientation of the reversible flange plate to engage a variety of differently configured brakes. The multiple applications of the reversible flange plate during operation allow an operator to purchase the single flange plate that replaces a number of single-sided flange plates. In addition, the reversible flange plate is easy to assemble on a brake lathe, and easy to operate. The reversible flange plate allows the operator of the brake lathe to produce a more accurately and precisely machined, turned and resurfaced brake. In combination with the apparatus and methods shown in the Prior Patents, undesirable forces that affect refinishing of a brake are reduced or eliminated. The reversible flange plate also is simple to reposition. By eliminating flange plates and adapter plates from the array of plates customarily required to refinish a brake, the reversible flange plate reduces the costs of manufacture, the costs associated with operating a brake lathe, and is respectively easy to use and to practice for its intended purposes.

SUMMARY

The term "brake" as used in this document includes both a brake disc or rotor, and a brake drum. As indicated, however, a side of a flywheel facing a pressure plate also be refinished using the reversible flange plate described and claimed in this document. The reversible flange plate, for refinishing differently configured brakes, includes a body. The body is formed with a hollow bore. The hollow bore extends through the center of the body. The body also includes a leading surface, a trailing surface, and a wall formed between the leading surface and the trailing surface. Opposing rings are formed on the leading surface and the trailing surface. The opposing rings are formed monolithically adjacent the bore, and extend outwardly from the leading surface and the trailing surface of the body coincident with a longitudinal axis through the hollow bore. In addition, opposing lips monolithically extend inwardly toward the bore from the peripheral edge of both the leading surface and the trailing surface. In one embodiment, an annular disc monolithically extends only from the leading surface and is located between the opposing rings and the opposing lips. In one embodiment, a resilient sleeve is attached to the wall between the leading surface and trailing surface to both enhance handling of the reversible flange plate by a user, as well as to dampen vibrations associated with operation of a brake lathe. The reversible flange plate, in operation, is used in combination with a brake lath equipped with an arbor.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the reversible flange plate will become apparent to those skilled in the art when read in conjunction with the following description, drawing figures, and appended claims.

The foregoing has outlined broadly the more important features of the invention to better understand the detailed description that follows, and to better understand the contributions to the art. The reversible flange plate is not limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the reversible flange plate, which is measured by the claims, nor intended to limit the scope of the claims. The novel features of the reversible flange plate are best understood from the accompanying drawing, considered in connection with the accompanying description of the drawing, in which similar reference characters refer to similar parts, and in which:

DETAILED DESCRIPTION

Figure 1:
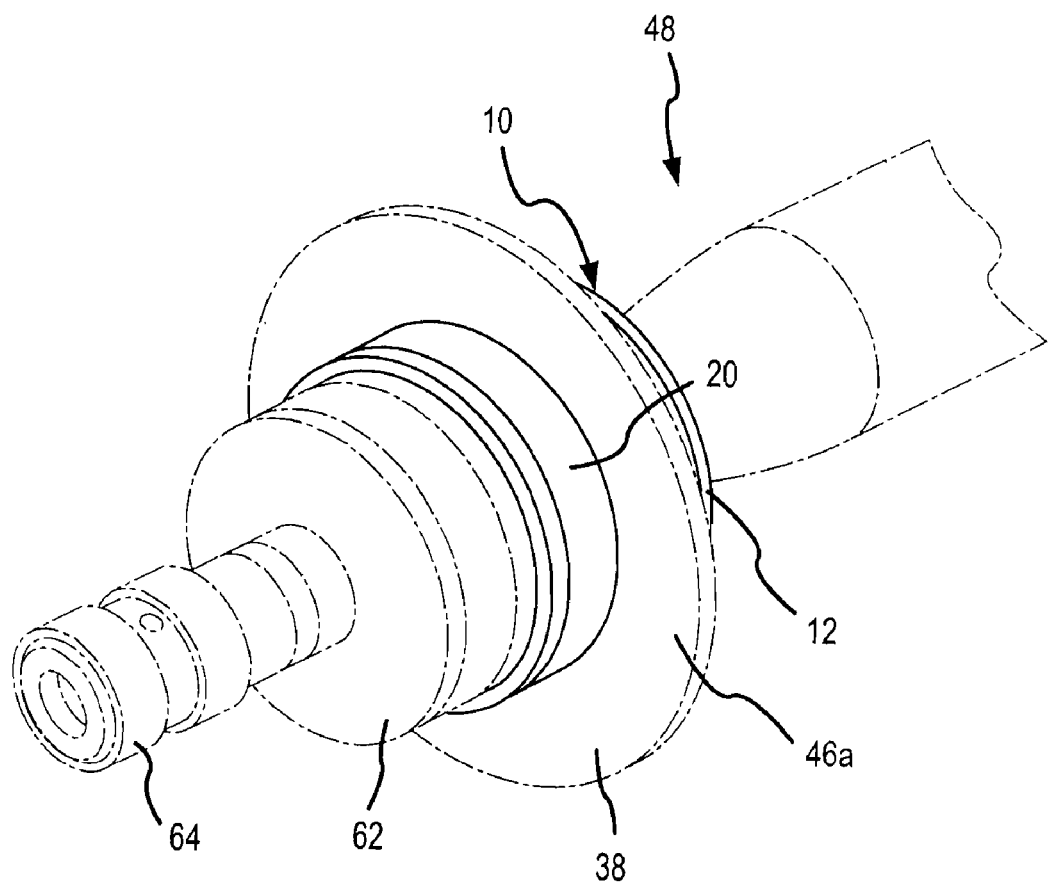
FIG. 1 of the drawing is a perspective view of the reversible flange plate in an operative environment mounted on a brake lathe.
Figure 2:
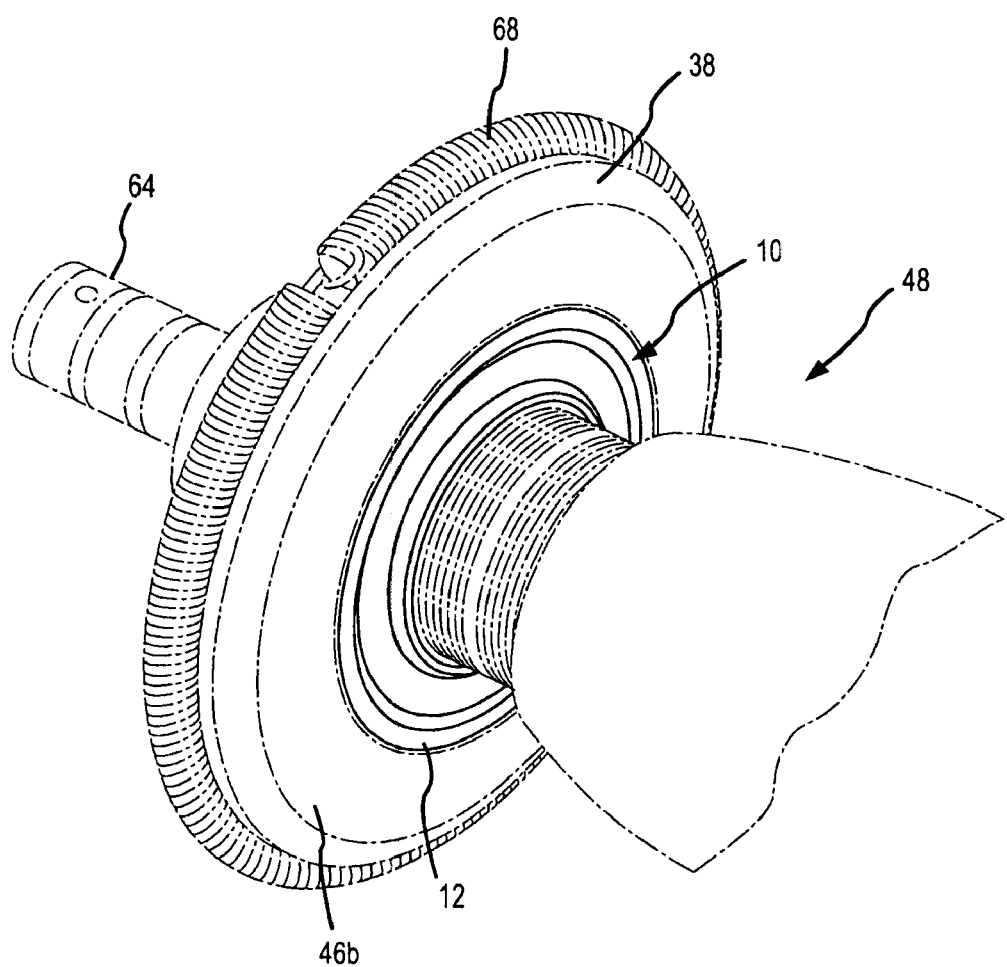
FIG. 2 is a perspective view of the reversible flange plate from the perspective of the arbor collar.

To the extent that subscripts to the numerical designations include the lower case letter "n," as in "a-n," the letter "n" is intended to express a large number of repetitions of the element designated by that numerical reference and subscripts.

As shown by cross-reference between FIGS. 1-5, a reversible flange plate 10 is provided. In its broadest context, reversible flange plate 10 includes a body 12. The body 12 is formed with a hollow bore 14 as shown perhaps best by cross-reference between FIGS. 3A, 4A-4D, and 5. Hollow bore 14 extends through the center of body 12. As shown by cross-reference between FIGS. 3A, 4A-4D, and 5, body 12 of reversible flange plate 10 is formed with a leading surface 16, a trailing surface 18, and a wall 20 formed between leading surface 16 and trailing surface 18.

As also shown by cross-reference between FIGS. 3A, 4A-4D, and 5 reversible flange plate 10 includes opposing rings 22a,b formed monolithically on both the leading surface 16 and the trailing surface 18 of body 12, opposing lips 24a,b monolithically extending from the peripheral edge 26 of both the leading surface 16 and the trailing surface 18 of body 12. In one embodiment, an annular disc 28 extends monolithically from the leading surface 16 between opposing rings 22a,b and opposing lips 24a,b.

Figure 3A:
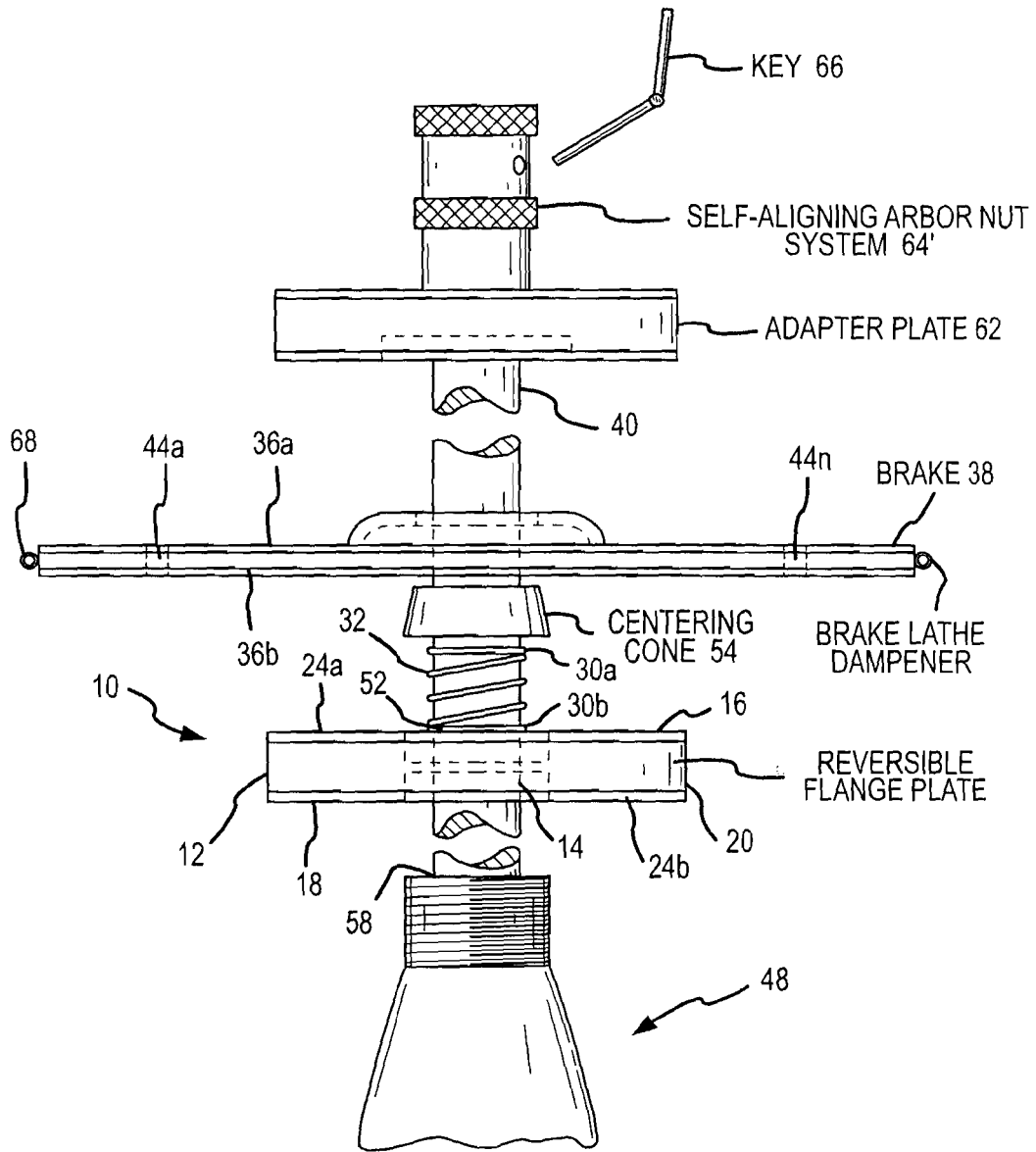
FIG. 3A is a top view of the reversible flange plate in combination with a variety of additional components of a brake lathe used during refinishing of a brake.
Figure 4A:
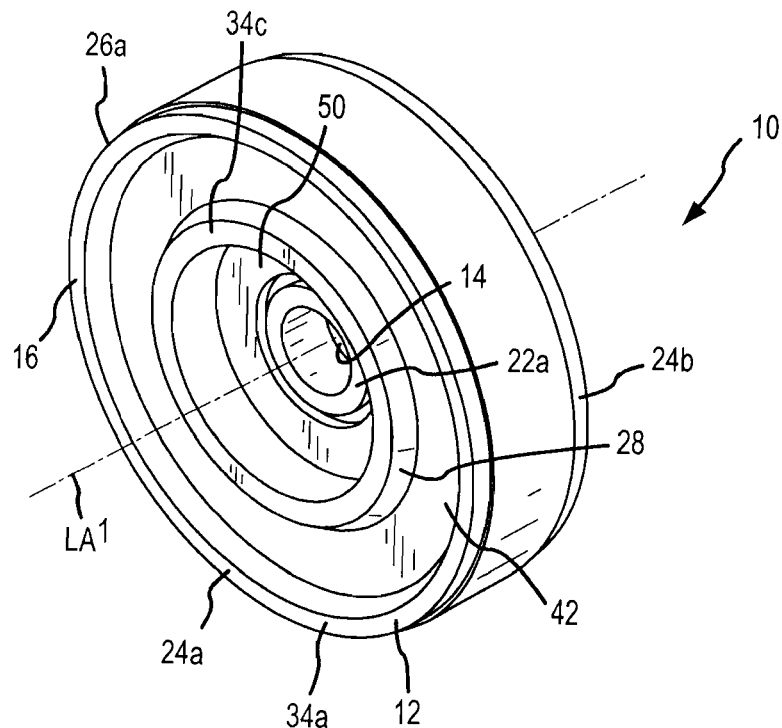
FIG. 4A is an end perspective view of one surface of the reversible flange plate.

More specifically, as shown perhaps best in FIG. 4A, opposing rings 22a,b are formed adjacent to hollow bore 14, and extend outwardly from a longitudinal axis ($LA^1$) through hollow bore 14, as best shown in FIG. 4A. As shown, opposing rings 22 are formed to be dimensionally engageable with one end 30b of ring 32 perhaps best shown in FIG. 3A.

As also shown by cross-reference between FIGS. 4A-4D, opposing lips 24a,b include a ledge 34a,b. The ledge 34a,b is adapted to engage a portion of a plane 36 of the brake 38. Thus, in operation, the ledge 34a,b is mounted against plane 36 of the brake 38 to control and reduce vibrations induced in the brake 38 during rotation of the arbor 40, as best shown in FIG. 3A. Likewise, the annular disc 28 that in one embodiment monolithically extends from only one of the opposing surfaces of the reversible flange plate, as shown perhaps best in FIGS. 4A-4B, also includes a ledge 34c. Ledge 34c also is mounted against a portion of plane 36 of the brake 38.

As will be evident to one skilled in the art, reversible flange plate 10 is formed with opposing structurally different surfaces, as described above, for refinishing a variety of differently configured brakes 38 that include structurally different and differently configured planes 36 on brake 38.

As also shown in FIG. 4A, reversible flange plate 10 includes a first chamber 42. The first chamber 42 is formed, in one embodiment, between one of the opposing lips 24a and annular disc 28 on the leading surface 16. First chamber 42 is adapted to accommodate varying spacing of one or more bolt holes 44a-n in a brake 38, as shown by cross-reference between FIGS. 3A-3B. The size, spacing, and number of boltholes 44a-n is not standard in the industry. Manufacturers vary the number of boltholes 44a-n. Manufacturers also vary the size and location of the differing number of boltholes 44a-n. The varyingly configured leading surface 16 and trailing surface 18 of reversible flange plate 10 accommodates the lack of standards in the industry.

Because brakes 38 are manufactured with bolt holes 44a-n and other features, such as indentations or raised portions (not shown) on opposing planes 46a,b of brake 38, none of which is standard in the industry, an operator of a brake lathe 48 is confronted with having to purchase a number of flange plates and adapter plates that attempt to anticipate the wide variety of structural differences in brakes 38. The reversible flange plate 10 responds to those problems by providing a reversible flange plate 10 capable of accommodating and adapting to the wide variety of different configurations among brakes.

Figure 3B:
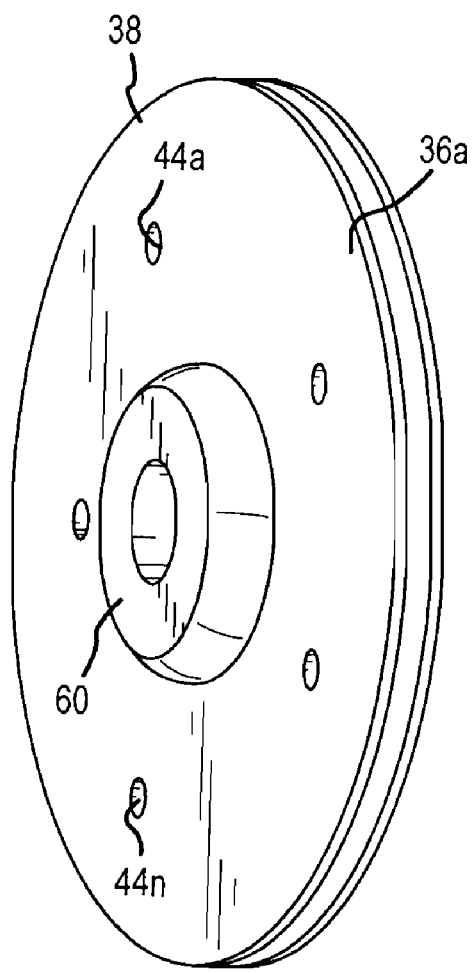
FIG. 3B is a perspective view of a brake, in this instance a rotor, showing five equally spaced boltholes.
Figure 3C:
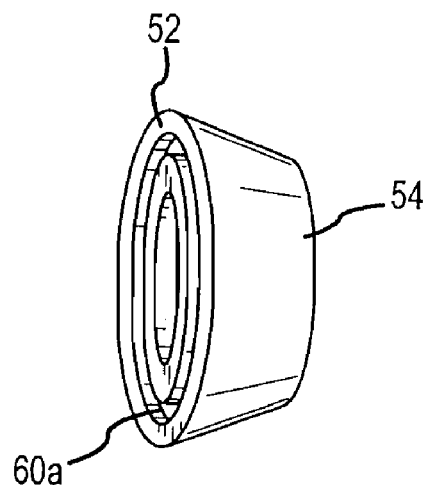
FIG. 3C is a side view of a centering cone formed with an angular groove for recessing one end of a spring.

As also shown by cross-reference between FIGS. 3A-3C, reversible flange plate 10 includes a second chamber 50. The second chamber 50, in one embodiment, is formed between the annular disc 28 and one of the opposing rings 22a on only the leading surface 16 of the reversible flange plate 10. Second chamber 50 is formed for recessing the lower end 52 of the centering cone 54 in second chamber 50 during operation of the brake lathe 48 for refinishing the brake 38.

Figure 4B:
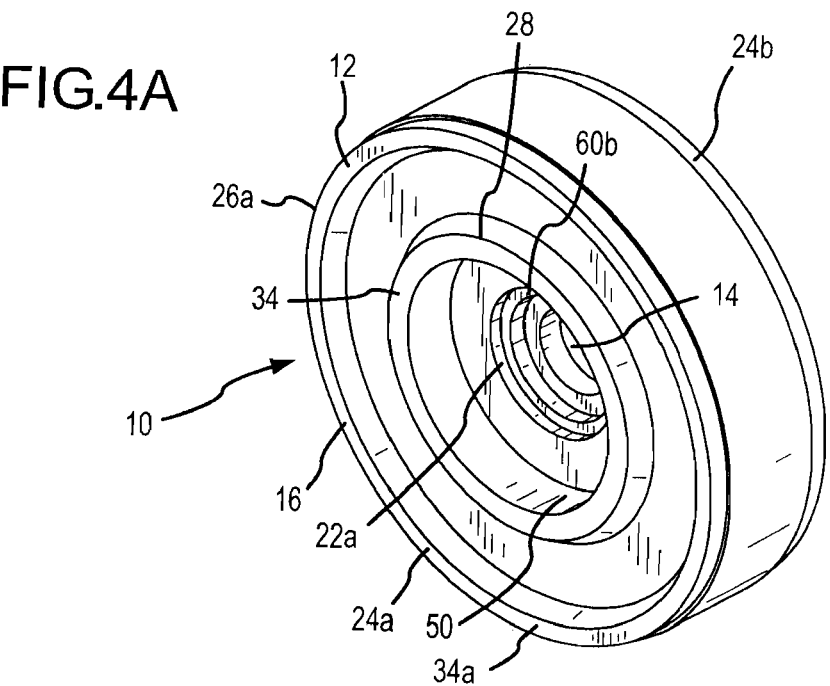
FIG. 4B is another end perspective view of another surface of the reversible flange plate.
Figure 4C:
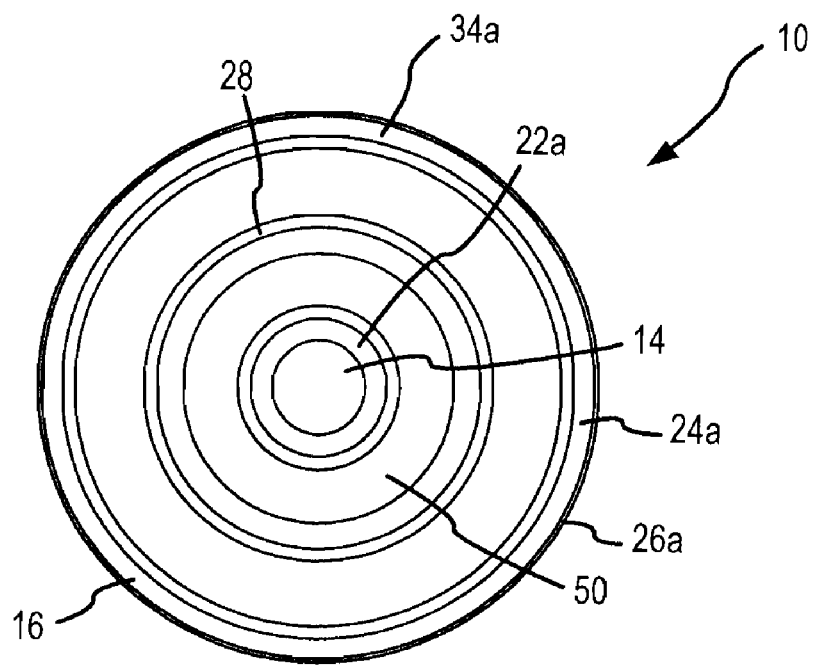
FIG. 4C is an end view of one surface of the reversible flange plate.
Figure 4D:
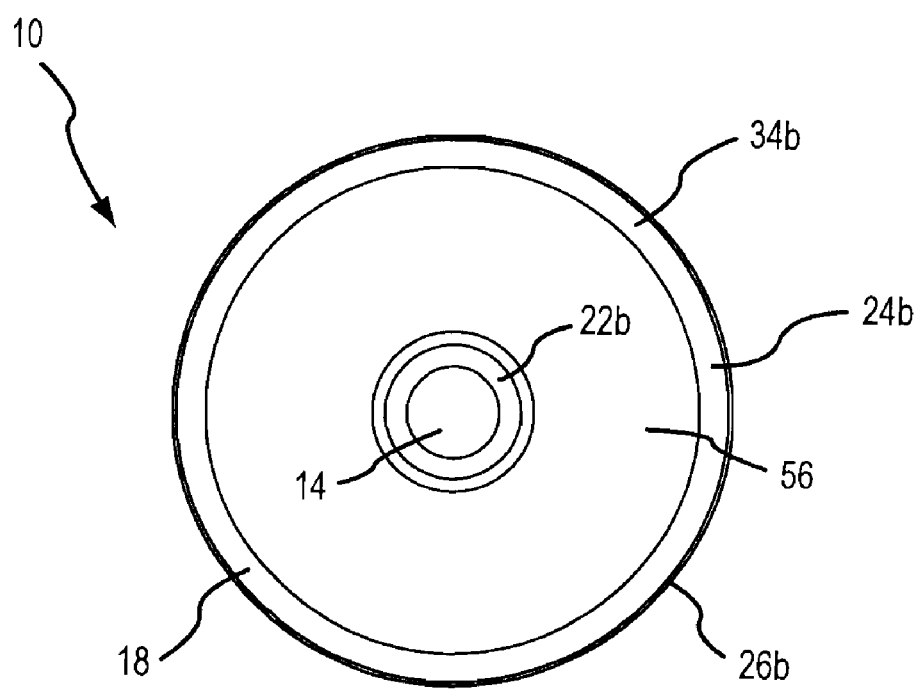
FIG. 4D is an end view of the opposing surface of the reversible flange plate.
Figure 5:
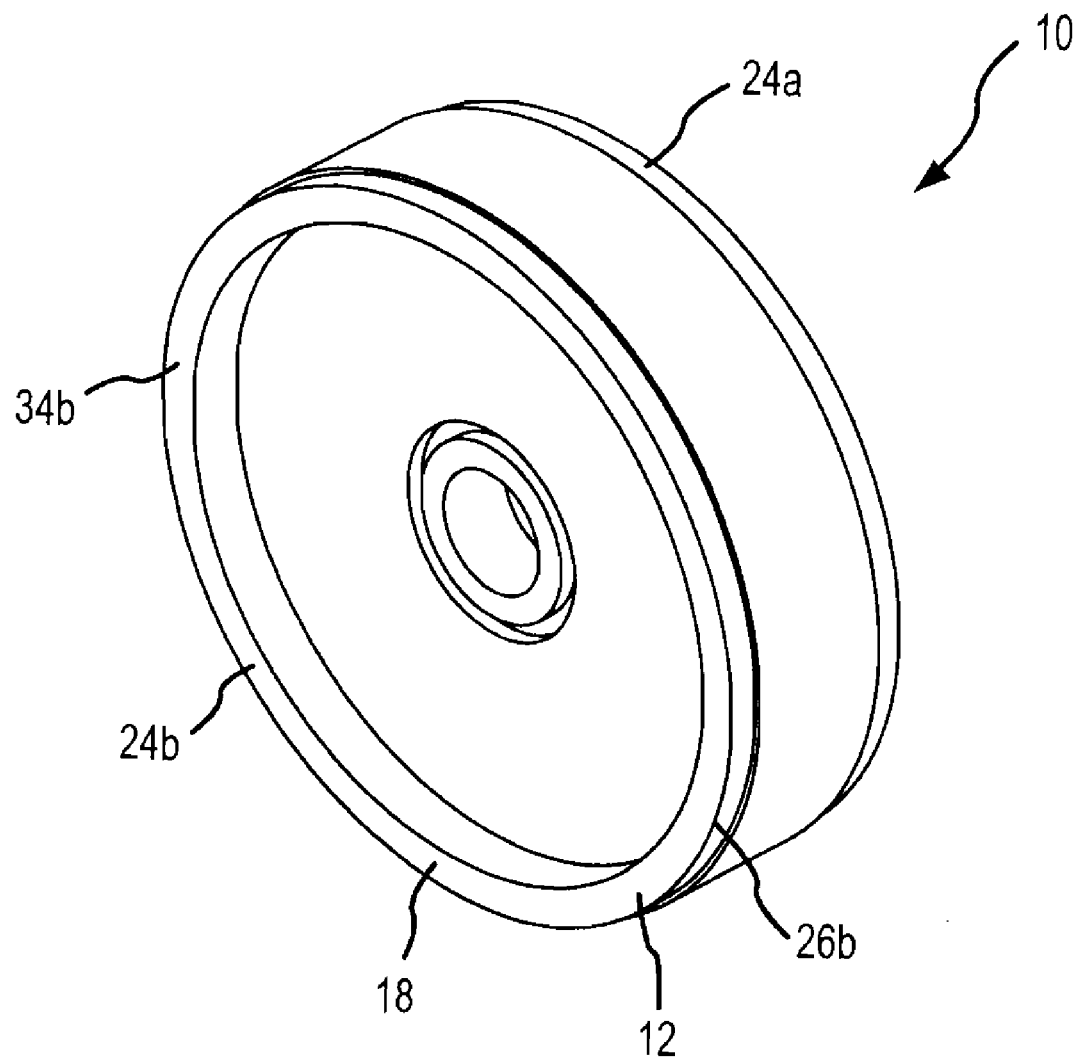
FIG. 5 is a perspective view showing FIG. 4D in perspective.

As also shown by cross-reference between FIGS. 4-5, reversible flange plate 10 includes a third chamber 56. The third chamber 56 is formed between opposing lip 24b and the opposing ring 22b on trailing surface 18 of the reversible flange plate 10. The third chamber 56 is adapted to accommodate varying spacing of one or more boltholes 44a-n in brake 38.

During operation and use of reversible flange plate 10, as shown in FIG. 3A, a brake lathe 48 equipped with an arbor 40 having a distal end (not shown) and a proximal end 58 is provided for refinishing a brake 38. An operator of the brake lathe 48 chooses a brake 38 for refinishing. A brake 38 generally is formed with a hat portion 60, as shown in FIG. 3B, extending monolithically from a first plane 36a of the brake 38, as shown perhaps best in FIG. 3B. The operator slides the reversible flange plate 10 onto the arbor 40. The centering cone 54 also is slidably mountable on the arbor 40, as perhaps best shown in the FIG. 3A. Spring 32 is positioned between the reversible flange plate 10 and the centering cone 54.

As shown in FIG. 3A and FIG. 3C, the centering cone 54 may be formed without any grooves, or with at least one groove 60 as shown in FIG. 3C. If a groove 60 is formed in the centering cone 54, the groove 60 is dimensioned to accommodate and adapt to one end 30b of the spring 32. The groove 60 is formed, as shown, adjacent the lower end 52 of the centering cone 54.

The brake 38 is installed on the arbor 40 as shown in FIG. 3A. At least one adapter plate 62 is slidably mounted on the arbor 40. An arbor nut 64, or preferably a self-aligning arbor nut system 64', manipulable by a key 66, is attached to the distal end (not shown) of the arbor 40 to secure the brake 38, the reversible flange plate 10, the spring 32, the centering cone 54, and the adapter plate 62 on the arbor 40 during rotation of the arbor 40 by an operator. The brake lathe 48 is energized to rotate the arbor 40, and the operator applies a shaping tool (not shown) to the brake 38 to refinish the brake 38. In addition, a brake lathe dampener 68 may be attached to the brake 38 to reduce vibration during operation.

Alternative structural features may be included to enhance operation. For example, as discussed above, a first groove 60a may be formed in the lower end 52 of the centering cone 54 that is engageable with one end 32b of the spring 32 as shown in FIG. 3C. In an alternative embodiment, a second groove 60b engageable with the other end 30a of the spring 32 may be formed in the leading surface 16 of the reversible flange plate 10, as shown in FIG. 4B. Although it is possible to provide for first groove 60a and second groove 60b simultaneously, in a preferred embodiment either first groove 60a or second groove 60b would be formed in their respective components to ensure that tension provided by spring 32 during operation is not affected. Thus, second groove 60b may be formed only in the trailing surface 18 of the reversible flange plate 10, and second groove 60b may be formed only in the leading surface 16 of the reversible flange plate 10.

As shown by cross-reference between FIGS. 1-5, the reverse flange plate 10 in one embodiment is substantially cylindrical. The hollow bore 14 is dimensioned for slidable engagement with a brake lathe arbor 40. The hollow bore 14 also is dimensioned for slidable removal of the reversible flange plate 10 from the arbor 40. Thus, the reversible flange plate 10 shown in drawing FIGS. 1-5 shows at least one embodiment that is not intended to be exclusive, but merely illustrative of the disclosed but non-exclusive embodiments.

Claim elements and steps in this document have been numbered and/or lettered solely as an aid in readability and understanding. The numbering is not intended to, and should not be considered as intending to, indicate the ordering of elements and steps in the claims.

What is claimed is:

1. A method for refinishing a brake, comprising the steps of:
   providing a brake lathe equipped with an arbor having a distal end and a proximal end;
   choosing for refinishing a brake formed with a hat portion extending monolithically from a first plane of the brake;
   removably sliding onto the arbor a reversible flange plate having a leading surface and a trailing surface that are structurally dissimilar to adapt to variably configured second planes of the brake;
   disposing a centering cone on the arbor;
   positioning a spring between the reversible flange plate and the centering cone;
   mounting slidably one or more adapter plates on the arbor;
   demountably attaching an arbor nut to the distal end of the arbor to secure the brake, reversible flange plate, spring, centering cone, and adapter plate on the arbor during operation;
   energizing the brake lathe to rotate the arbor; and
   applying a shaping tool to the brake to refinish the brake.

2. A method for refinishing a brake as recited in claim 1, wherein the brake choosing step includes the substeps of:
   choosing a brake rotor; or
   choosing a brake drum; or
   choosing a flywheel.

3. A method for refinishing a brake as recited in claim 1, wherein the centering cone disposing step includes the substep of forming in one side of the centering cone means engageable with one end of the spring.

4. A method for refinishing a brake as recited in claim 1, wherein the centering cone disposing step includes the substep of forming in the leading surface and the trailing surface of the reversible flange plate a ring engageable with the other end of the spring.

5. A method for refinishing a brake as recited in claim 1, wherein the centering cone disposing step includes the substeps of:
   forming in one side of the centering cone a first groove engageable with at one end of the spring;
   forming in the leading surface of the reversible flange plate a second groove engageable with the other end of the spring; or
   forming in the trailing surface of the reversible flange plate a second groove engageable with the other end of the spring; or
   forming in the leading surface and the trailing surface of the reversible flange plate a second groove engageable with the other end of the spring.

6. A method for refinishing a brake as recited in claim 1, wherein the centering cone disposing step includes the substep of attaching to the brake an apparatus for reducing harmonics and vibrations.

7. A method of refinishing differently configured brakes, comprising:
   constructing a reversible flange plate by forming a body with a hollow bore extending through the center of the body, having a leading surface, a trailing surface, and a wall between the leading surface and the trailing surface;

installing opposing rings adjacent the hollow bore monolithically extending outwardly from the leading surface and the trailing surface of the body coincident with a longitudinal axis through the hollow bore;

manipulating the body by providing opposing lips that monolithically extend inwardly toward the hollow bore from the peripheral edge of the leading surface and the trailing surface; and including an annular disk that monolithically extends from the leading surface between the opposing rings and the opposing lips.

8. A method of refinishing differently configured brakes as recited in claim 7, further comprising shaping the body to be substantially cylindrical.

9. A method of refinishing differently configured brakes as recited in claim 8, further comprising dimensioning the bore for slidable engagement with, and slidable disengagement from, a brake lathe arbor.

10. A method of refinishing differently configured brakes as recited in claim 9, further comprising attaching a resilient sleeve to the wall for ease of handling of the reversible flange plate and for dampening vibrations during operation.

11. A method of refinishing differently configured brakes as recited in claim 10, further comprising adding a centering cone to the brake lathe arbor.

12. A method of refinishing differently configured brakes as recited in claim 11, further comprising adding a spring between and adjacent to the opposing rings.

13. A method of refinishing differently configured brakes as recited in claim 12, further providing means on the opposing rings engageable with an end of the spring.

14. A method of refinishing differently configured brakes as recited in claim 13, further comprising shaping the annular disk to include a first ledge adapted to engage a plane of the differently configured brakes.

15. A method of refinishing differently configured brakes as recited in claim 14, further comprising shaping the opposing lips to include a second ledge adapted to engage a plane of the differently configured brakes.

* * * * *